United States Patent [19]

Dawson et al.

[11] Patent Number: 5,336,316
[45] Date of Patent: Aug. 9, 1994

[54] CEMENTING COMPOSITION AND METHOD USING PHOSPHONATED POLYMERS TO IMPROVE CEMENT SLURRY PROPERTIES

[75] Inventors: Jeffrey C. Dawson; William R. Wood, both of Spring, Tex.

[73] Assignee: BJ Services Company, Houston, Tex.

[21] Appl. No.: 58,295

[22] Filed: May 6, 1993

[51] Int. Cl.$^5$ ............................................. C04B 22/16
[52] U.S. Cl. ................................... 106/724; 106/785; 106/790; 106/819; 106/823
[58] Field of Search ................ 106/629, 630, 696, 719, 106/724, 776, 785, 802, 819, 823, 790, 795; C04B 22/16

[56] References Cited

U.S. PATENT DOCUMENTS

| | | | |
|---|---|---|---|
| 3,346,487 | 10/1967 | Irani et al. | 252/8.5 |
| 3,925,456 | 12/1975 | Ploger et al. | 106/785 |
| 4,267,108 | 5/1981 | Blum et al. | 424/200 |
| 4,309,523 | 1/1982 | Engelhardt et al. | 526/240 |
| 4,401,473 | 8/1983 | Kleiner | 106/785 |
| 4,557,763 | 12/1985 | George et al. | 106/90 |
| 4,601,758 | 7/1986 | Nelson | 106/90 |
| 5,028,341 | 7/1991 | Liao et al. | 166/294 |

Primary Examiner—Karl Group
Assistant Examiner—Paul Marcantoni
Attorney, Agent, or Firm—Charles D. Gunter, Jr.; Susan L. Firestone

[57] ABSTRACT

An oil and gas well cementing composition and method is shown utilizing hydraulic cement, water and an additive having pendant phosphonate groups on a polymeric backbone. The additive provides improved fluid loss and settling characteristics while maintaining desirable viscosity and setting time characteristics. Pendant phosphonate groups are added to the polymer by adding about 0.2% to about 10.0% by weight phosphonic acid either during or after polymerization.

40 Claims, 1 Drawing Sheet

CEMENTING COMPOSITION AND METHOD USING PHOSPHONATED POLYMERS TO IMPROVE CEMENT SLURRY PROPERTIES

BACKGROUND OF THE INVENTION

1. Field of the Invention

The present invention relates to cementing compositions and a polymeric additive having phosphonate groups pendant to the polymeric backbone which improves fluid loss control and settling properties, as well as methods of using them.

2. Description of the Prior Art

Hydraulic cements are cements that can set under water. This setting property serves a variety of purposes. Hydraulic cements are often used in placement of pipes or casings within a well bore of a subterranean formation for the construction of oil, gas and water wells. In the oil and gas industry, successful cementing of well pipe and casing during oil and gas well completion requires cement slurries having several important properties. The slurry must have a pumpable viscosity, fluid loss control, minimized settling of particles and the ability to set within a practical time. Polymers, such as hydroxyethyl cellulose, carboxymethylhydroxyethyl cellulose, polyvinyl alcohol and polysulfonated polymers are commonly used to provide these important properties.

In a typical completion operation, the cement slurry is pumped down the inside of the pipe or casing and back up the outside of the pipe or casing through the annular space. This seals the subterranean zones in the formation and supports the casing. The amount of water used in forming the cement slurry depends upon the type of hydraulic cement selected and the job conditions at hand. The amount of water used can vary over a wide range, depending upon such factors as the required consistency of the slurry and upon the strength requirement for a particular job.

These completion procedures often place the hydraulic cement within or next to a porous medium, for example, earthern strata in the well bore. When this happens, water tends to filter out of the slurry and into the strata during placement and setting of the cement. Many difficulties relate to an uncontrolled fluid loss of this type, such as an uncontrolled setting rate, premature gellation of the slurry, bridging of the annular space between the formation and the casing, improper placement of the slurry, impaired strength properties and a contamination of the surrounding strata. These conditions are all undesirable in oil, gas and water well cementing operations.

To lessen fluid loss from the aqueous cement slurry, various of the above mentioned polymeric materials are employed as fluid loss additives. These polymers, while improving certain properties of the slurry, also have attendant disadvantages. For example, these polymers are frequently used at higher concentrations for higher temperatures or with salt to provide adequate fluid loss control. At higher polymer concentrations, the slurry viscosity usually becomes unmanageable, frequently causing high friction pressures during pumping, and its cost effectiveness declines.

The addition of salts such as sodium, potassium or calcium chloride to a cement slurry has several advantages. Salt containing slurries bond more firmly to salt laden intervals often found in subterranean formations. Salts help protect salt formations from leaching or washing out.

The addition of salts, however, has several disadvantages. The effectiveness of fluid loss additives decreases at higher salt concentrations. Therefore, a greater amount of additive is used to maintain effectiveness. However, such increased amounts of additive adversely affect slurry properties since these additives also act as retarders and viscosifiers.

In spite of the recent advances, a need exists for an improved polymeric additive for well cementing compositions which provides a slurry having a pumpable viscosity, adequate fluid loss control, minimized settling of particles and the ability to set within a practical time, both with and without salt.

A need also exists for such an additive which is effective at lower concentrations and over a broader temperature range than currently available additives used to achieve the above listed properties.

SUMMARY OF THE INVENTION

The cementing compositions of the invention are comprised of hydraulic cement, an additive comprising a phosphonated polymer with phosphonate groups pendant to the polymer's backbone and water. The phosphonate groups can be added either during polymerization or after polymerization of a water hydratable polymeric backbone.

The cementing compositions should preferably have hydraulic cement, water present in an amount effective to produce a pumpable slurry, and the additive present in an amount effective to improve fluid loss and settling characteristics of the resulting slurry while maintaining desirable viscosity and setting time characteristics. The additive is most preferably used in the range of about 0.2% to about 3% based on the dry weight of the hydraulic cement.

One preferred class of additives of the invention are prepared with about 0.2% to about 10% vinyl phosphonic acid based on the polymer weight. A particularly preferred additive is a phosphonated, polysulfonated copolymer made with about 1% to about 3% by weight vinyl phosphonic acid added during aqueous polymerization. One such particularly preferred additive is a copolymer of acrylamide, sodium acrylamidomethylpropanesulfonate, vinylmethylacetamide and vinyl phosphonic acid.

A method of cementing a well bore is also shown. A cementing composition is made by mixing together a hydraulic cement, water in an amount sufficient to produce a pumpable slurry, and the additive which is the previously described phosphonated polymer. The cement composition is pumped to the desired location in the well bore and allowed to harden to a solid mass.

Additional objects, features and advantages will be apparent in the written description which follows.

DETAILED DESCRIPTION OF THE INVENTION

Figure 1:
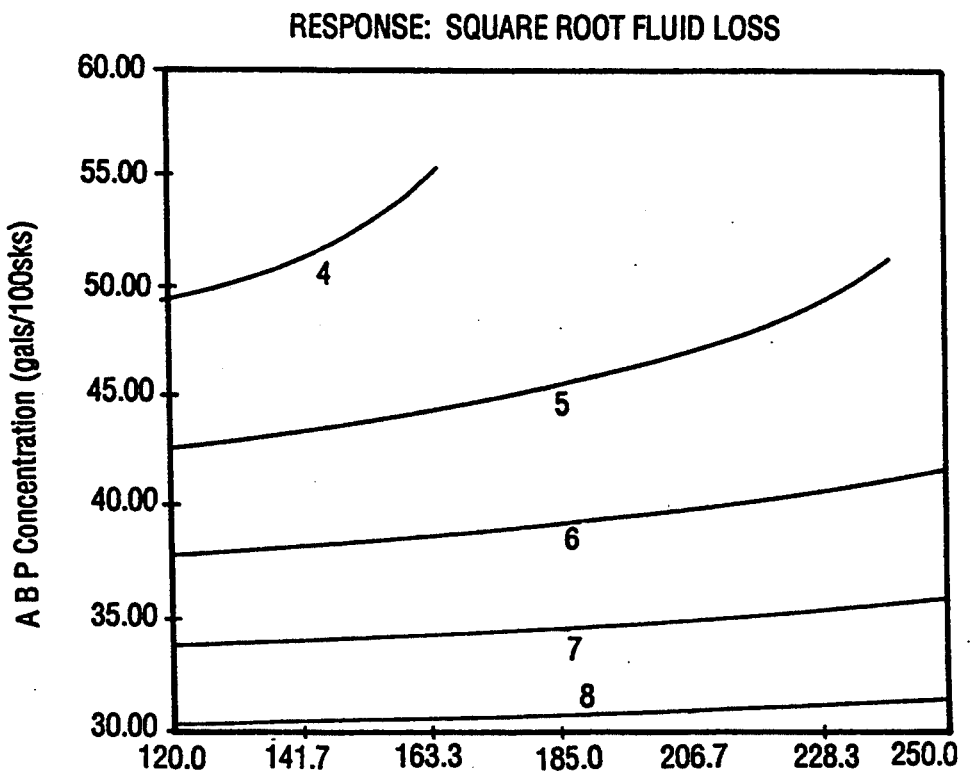
FIG. 1 is a response surface plot of polymer concentration versus temperature for a cementing composition with a phosphonated, polysulfonated polymer additive prepared by one of the methods of the invention.

The invention relates to an improved cementing composition and the method of using the cementing composition. The invention also relates to a cementing additive and the method of making the additive. The cementing composition is composed of hydraulic cement, an additive containing a phosphonated polymer and water.

In this disclosure, the term "hydraulic cement" refers to any inorganic hydraulic cement that hardens or sets with water. The term "hydraulic cement" also includes cements having minor amounts of extenders such as bentonite, gilsonite, and cements used either without any appreciable sand or aggregate material or such cements admixed with a granular filling material such as sand, ground limestone, fly ash, and the like. Hydraulic cements, for instance, include Portland cement, aluminous cements, pozzolan cements, and the like. Thus, for example, any of the class "A-H" and "J" cements as listed in the *API Spec 10 First Edition*, January 1982 are suitable for the invention. Strength enhancers such as silica powder can be employed as well.

Mixing water with the dry hydraulic cement compositions produces a slurry. A sufficient amount of water should be added to the hydraulic cement to form a pumpable slurry of suitable consistency. The water can be any type of water commonly used in the cement industry, such as fresh water, brines, sea water, and the like. The water can have additional additives present, for instance, potassium chloride, dispersants, accelerators, viscosifiers and retarders. *API Spec 10 First Edition*, January 1982, which is known in the cement industry, describes an approved apparatus and method for measuring the consistency of cement slurries in terms of Bearden units of consistency (Bc). A pumpable slurry should measure in the range from about 2 to 20 Bc and preferably be in the range of about 5 to 11 Bc. Slurries thinner than 5 Bc tend to have greater particle settling and free water generation. Slurries thicker than about 11 Bc become increasingly difficult to pump.

Depending upon the particular slurry and intended conditions of use, the amount of mixing water in the slurry of the present invention ranges from about 30 to 150 weight percent based upon the dry weight of cement and preferably is in the range of about 35 to 90 weight percent.

The cement compositions of the invention include a water hydratable additive, in addition to hydraulic cement and water. The additive is a phosphonated polymer with phosphonate groups pendant to the polymer's backbone. Pendant phosphonate groups substantially improve cement slurry properties over those provided by the previously known polymer additives. The pendant phosphonate groups can be distributed randomly or grafted to the backbone as short multiphosphonated chains. Phosphonated polymers include homopolymers with pendant phosphonate groups or copolymers having the pendant phosphonate group.

The polymers can be phosphonated by any method that adds a pendant phosphonate group under suitable conditions, such as phosphorus trichloride, phosphonic acid or phosphonate. Phosphonic acid and phosphonate have the following general structure:

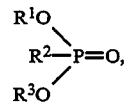

where $R^1$, $R^2$ and $R^3$ are hydrogen or an organic radical. Preferably, $R^2$ is a 2 to 4 carbon alkenyl and $R^1$ and $R^3$ are hydrogen or $R^2$ is a 2 to 4 carbon alkenyl, and $R^1$ or $R^3$ is a hydrogen while the other R group, $R^3$ or $R^1$ respectively, is a phosphonic acid or phosphonic acid polymer sharing an oxygen. In the latter case, this linkage is similar to phosphatidyl linkages, although it may include any isomers, including cis and trans isomers. Cis isomers, however, are preferred. One example of this linkage is a polymer with the following general structure:

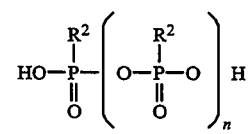

where n is an integer. Preferably n is equal to 1 to 3. More preferred phosphonic acids are vinyl phosphonic acid, methvinyl phosphonic acid and polyvinylphosphonic acids and their salts. Vinyl phosphonic acid, available from Hoechst-Celanese, and its salt are most preferred.

In this disclosure and claims, the term "phosphonic acid" refers to the above general structure with the hydroxyl group, while "phosphonate" refers to its salt. In this disclosure and claims, the terms will be used interchangeably to refer to the above-mentioned structure.

The polymer backbone can be any water hydratable polymer, preferably a polyoxygenated polymer such as those having multiple sulfonate or hydroxyl groups. Examples of these polymers are polysaccharides, polyvinyl alcohol, polysulfonated polymers, and the like. Suitable polysaccharides, for instance, include celluloses, galactomannan gums, glucomannan gums, and the like. Specific examples of suitable polysaccharides include cellulose, hydroxyethyl cellulose, carboxymethyl cellulose, carboxymethyl hydroxyethyl cellulose, guar gum, hydroxypropyl guar, carboxymethyl hydroxypropyl guar, starch, xanthan gum, karaya gum, locust bean gum, arabic gum, pectin, and the like.

The synthetic polymer can be phosphonated by adding phosphonate during polymerization or after polymerization. Phosphonate should be added at a final concentration of about 0.2% to about 10% by weight based on the polymer weight. A final concentration of about 1% to about 3% by weight is preferred.

During polymerization, a phosphonate is added to the reaction mixture to introduce phosphonate groups to the growing polymer. Preferably, these phosphonated polymers are by solution polymerization techniques in which the selected monomers are dissolved in water, followed by the addition of a phosphonate and catalyzing the reaction to form the desired polymer. One example of these polymers are random, phosphonated polysulfonated polymers, such as a phosphonated copolymer of acrylamide, sodium acrylamidomethylpropanesulfonate and vinylmethylacetamide or copolymers of acrylamide and 2-acrylamido-2-methyl propane sulfonate.

Phosphonation occurs after polymerization by reacting a water hydratable polymer having multiple hydroxyl groups with phosphonic acid Phosphorus trichloride. Examples of these water hydratable polymers are the polysaccharides discussed above, polyvinyl alcohol, and the like. To add pendant phosphonate groups, the phosphonating agent is added to a solution of water hydratable polymer. The resulting solution is frequently acidic and should be neutralized with a base. After neutralization, the reaction is commonly initiated by the addition of a catalyst, such as ammonium persulfate, sodium sulfite, and other oxidizers.

In the cementing composition and the method of using the composition, the phosphonated polymer additive should be present in an amount sufficient to decrease fluid loss from the slurry while improving the slurry's settling characteristics. Yet, the phosphonated polymer additive effectively maintains desirable viscosity and setting time characteristics of the slurry. Since the properties of the subterranean strata vary from location to location, the amount of phosphonated polymer used in the cementing composition varies as well. Testing to determine the desired amount of additive for a particular subterranean stratum is well known in the art, such as the previously discussed *API Spec 10*. Additive concentrations should range from about 0.1% to about 5% by weight based on the dry weight of the cement, with about 0.5% to about 3% preferred.

Although the above disclosed polymers are useful for the cementing composition and additive, a polysulfonated polymer is preferred. These polymers are known in the art. For example, U.S. Pat. No. 4,632,186, entitled *Well Cementing Method Using an AM/AMPS Fluid Loss Additive Blend,* and assigned to the assignee of the present invention, teaches the use of a polymeric fluid loss additive which is a copolymer of acrylamide and 2-acrylamido-2-methylpropanesulfonate. Another example of a fluid loss additive for oil field cements is a copolymer of N,N-dimethylacrylamide and 2-acrylamido-2-methylpropane sulfonic acid. Fluid loss additives are commonly combined with naphthalene sulfonic acid-formaldehyde condensate to enhance fluid loss control and reduce the slurry's apparent viscosity. Other sulfonated poly(vinyl aromatics) used as cement additives include the sulfonated polystyrenes and the sodium salts of sulfonated polyvinyltoluene.

Polysulfonated polymers, useful for the purposes of the present invention, consist essentially of a random distribution of:

(a) 5 to 95% by weight of units of the formula

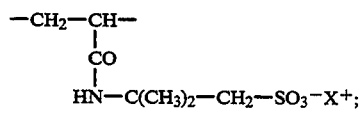

(b) 5 to 95% by weight of units of the formula

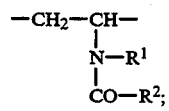

(c) 0 to 80% by weight of units of the formula

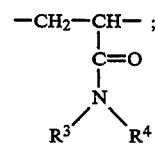

wherein $R^1$, $R^2$, $R^3$ and $R^4$ are hydrogen, methyl or ethyl and $X^+$ is a cation, such as sodium or potassium. In addition, (a) can include vinyl sulfonate, styrene sulfonate, and the like, (b) can include vinyl pyrrolidone, while (c) can also include dimethyl acrylamide and other acrylamide substituents.

The above preferred polysulfonates can be prepared as described in U.S. Pat. No. 4,309,523, entitled *Water Soluble Copolymer of Acrylamidomethylpropanesulfonic Acids Salts,* to Engelhardt et al., the disclosure of which is incorporated herein by reference. For example, the water soluble copolymers of the invention can successfully be prepared as follows: for every 100 parts by weight of the copolymer, 5 to 95 parts by weight of 2-acrylamido-2-methylpropane-3-sulfonic acid are dissolved in water or a water-miscible organic solvent and neutralized by adding a base; 5 to 95 parts by weight of a vinylacrylamide; from 0 to 80 parts by weight of acrylamide and between about 0.25%–5% by weight vinyl phosphonic acid are added to the neutralized sulfonic solution. Copolymerization is then initiated and carried out at 10° to 120° C. in a manner known in the art.

As a further example, preferred polysulfonated polymers of the invention can be prepared from 30 to 70 parts by weight 2-acrylamido-2-methylpropane-3-sulfonic acid, 10 to 30 parts by weight of n-vinyl acetamide, 0 to 60 parts by weight of acrylamide and about 0.25%–5% by weight of vinyl phosphonic acid are employed for the preparation of every 100 parts by weight of the copolymer.

The previously mentioned starting copolymers can be prepared in any manner known in the art, although solution polymerization techniques are preferred. This general technique calls for dissolving the selected monomers in a suitable solvent, followed by catalyzing the reaction to form the polymer. In addition to the previously cited U.S. Pat. No. 4,309,523, the following patents teach the general techniques used in the preparation of such polysulfonated polymeric additives: U.S. Pat. No. 4,015,991, *Low Fluid Loss Cementing Compositions Containing Hydrolyzed Acrylamide-2-acrylamido-2-methylpropanesulfonic Acid Derivative Copolymers and Their Use,* to Persinski et al. and U.S. Pat. No. 2,868,753, *Hydraulic Cement Compositions Containing Acrylamide-Acrylic Acid Copolymers and Method of Making the Same.*

The previously cited U.S. Pat. No. 4,309,523, discloses the use of either aqueous or non-aqueous solvents to prepare polysulfonated polymers useful in well drilling operations prepared. The preferred method of the present invention is to prepare aqueous-based polysulfonated polymers in aqueous solvents. A chain transfer agent, such as sodium thioglycolate can be used as a polymer molecular weight regulator. Catalysts, for instance, sodium sulfite and sodium persulfate and other oxidizers, may be used to initiate polymerization. When water is the process solvent, polymerization proceeds under the conditions of solution polymerization and produces a viscous aqueous solution of the copolymer.

The copolymer can be isolated from this viscous solution by drying such as simply distilling off the water or precipitating with a water-miscible organic solvent, such as methanol, ethanol, acetone, and the like. The polymer can also be used as the aqueous solution without isolation after manufacture.

In the non-aqueous process, the monomers are dissolved in a non-aqueous solvent and polymerization is initiated. As the propagating polymer grows to a specific molecular weight, it becomes insoluble in the solvent and precipitates from solution. The resulting polymer is then filtered and bagged. The non-aqueous process is excessively costly.

In contrast, aqueous-based polysulfonated polymers are inexpensive to make. Cementing compositions containing non-aqueous-based copolymers of acrylamide, sodium acrylamidomethylpropanesulfonate and vinylmethylacetamide have suitable properties in cementing compositions at temperatures in excess of 130° F. However, these same cement compositions perform poorly at lower temperatures. Other previous attempts to polymerize the polysulfonated polymer in water using the same monomers described above produced an aqueous-based polymer that performed very poorly in cement. Varying the monomer ratio, molecular weight and molecular weight distribution did not significantly improve test results.

Adding low concentrations of phosphonates to the polymerization solution described above substantially improves the cement slurry properties of aqueous-based, polysulfonated polymeric additives. These improved properties are beyond those due to the non-aqueous prepared polymer. Thus, in the previously described solution polymerization technique, the addition of from 0.20 to 10.0% by weight phosphonate to the monomers adds pendant phosphonate groups to the backbone which provides a significantly improved product.

In a method of using the cementing composition, a pumpable slurry is made by adding together hydraulic cement, water and the additive described above to make the cementing composition described above. The pumpable slurry is then pumped to a desired location within a well bore, where it is allowed to harden. The cementing composition is especially useful for oil, gas and water well operations described in the prior art.

The following non-limiting examples are illustrative of the invention.

SLURRY PREPARATION AND TESTING

Slurries used in the evaluation of the fluid loss additives were mixed in a Waring blender, following Section 5 of *API Spec* 10. Procedures used to measure fluid loss were obtained from *API Spec* 10 also.

EXAMPLE 1

Polysulfonated polymers were prepared by solution polymerization techniques. The aqueous-based polymer (ABP) is polymerized with small amounts of vinyl phosphonic acid (VPA) and is compared to the ABP polymerized without VPA in a fresh water cement system. Both polymers are prepared as described in U.S. Pat. No. 4,309,523, except that VPA is added to the ABP during polymerization. The monomer composition was 35%(wt.) acrylamidomethylpropanesulfonic acid (AMPS), 15%(wt.) N-vinyl acetamide, 47%–50% (wt.) acrylamide and 0%–3% (wt.) VPA as shown in Table 1. The polymer was made from 70 g of AMPS and 0 to 6 g VPA added to 700 g of distilled water. The pH of the resulting solution was adjusted to a pH 8.0 with about 50 g of 25% sodium hydroxide, depending on the amount of VPA. Then, 30 g of vinyl acetamide and lastly, 94 to 100 g acrylamide were added to the solution. Additional distilled water was added to dilute the solution to 20% active monomer. A chain transfer agent, 0.1 to 0.5 g of sodium thioglycolate, was added as the polymer molecular weight regulator. Also, 200 ppm sodium sulfite and 900 ppm sodium persulfate were used as catalysts to initiate the polymerization. The solution was degassed with nitrogen at ambient temperature and continuously stirred. About a 30° C. increase in temperature and increase in solution viscosity usually occurred during polymerization. The Fikentscher number (K value) of the resulting polymers were measured as described by Fikentscher in the journal Cellulose Chemistry, 13, 58(1932). The K value is an index of polymer molecular weight.

A cement slurry containing 786.3 g of Class G cement, 14.8 g of the polymer solution prepared above and 335.6 g of water were mixed and conditioned according to the procedure described by the *API Spec* 10. The slurry density was 15.8 lbs/gal and test temperature was 120° F. The fluid loss measurements (cc/30 min) were run following the *API Spec* 10 with the results shown in Table 1.

TABLE 1

| K-Value | % VPA (wt polymer) | API FL(cc/30 min) |
| --- | --- | --- |
| 145 | 0 | 669 |
| 182 | 0 | 632 |
| 191 | 0.25 | 38 |
| 159 | 1.0 | 57 |

EXAMPLE 2

A cement slurry composed of 761.3 g of Class G cement, 60.6 g of sodium chloride, 21.5 g of polymer solution prepared as described in Example 1 and 316.2 g of water were mixed and conditioned as described in API Spec 10 at 120° F. This slurry density was 16.1 lbs/gal and contains 18%(wt based on the water) sodium chloride. Again, *API Spec* 10 procedures were used to measure fluid loss control with results shown in Table 2.

TABLE 2

| K-Value | % VPA (wt polymer) | API FL(cc/30 min) |
| --- | --- | --- |
| 182 | 0 | 790 |
| 169 | 0 | 953 |
| 166 | 1.0 | 103 |
| 159 | 1.0 | 152 |

EXAMPLE 3

A cement slurry containing 805.8 g Class H cement, 58.2 g sodium chloride, 30.32 g of the polymers described in Example 1, 1.61 g of a sodium lignosulfonate retarder and 294.5 g of water was mixed and conditioned. The slurry density was 16.5 lbs/gal and was heated to 200° F. as per *API Spec* 10. API fluid loss measurements at this temperature were made and shown in Table 3.

TABLE 3

| K-Value | % VPA (wt polymer) | API FL(cc/30 min) |
| --- | --- | --- |
| 170 | 1 | 54 |
| 170 | 2 | 68 |

TABLE 3-continued

| K-Value | % VPA (wt polymer) | API FL(cc/30 min) |
|---|---|---|
| 170 | 3 | 201 |
| 169 | 0 | 953 |

Table 1 shows that adding up to 1% VPA during the ABP polymerization produces an additive that decreases fluid loss dramatically. Table 2 shows that adding pendant phosphonate groups to the ABP formulation decreases fluid loss dramatically, even in the presence of sodium chloride which is usually detrimental to typical fluid loss additives and causes excessive water loss. Table 3 shows that increasing the VPS concentration during the ABP polymerization, increases the fluid loss. But this fluid loss is still much less than in ABP slurries without pendant phosphonate groups.

EXAMPLE 4

Figure 2:
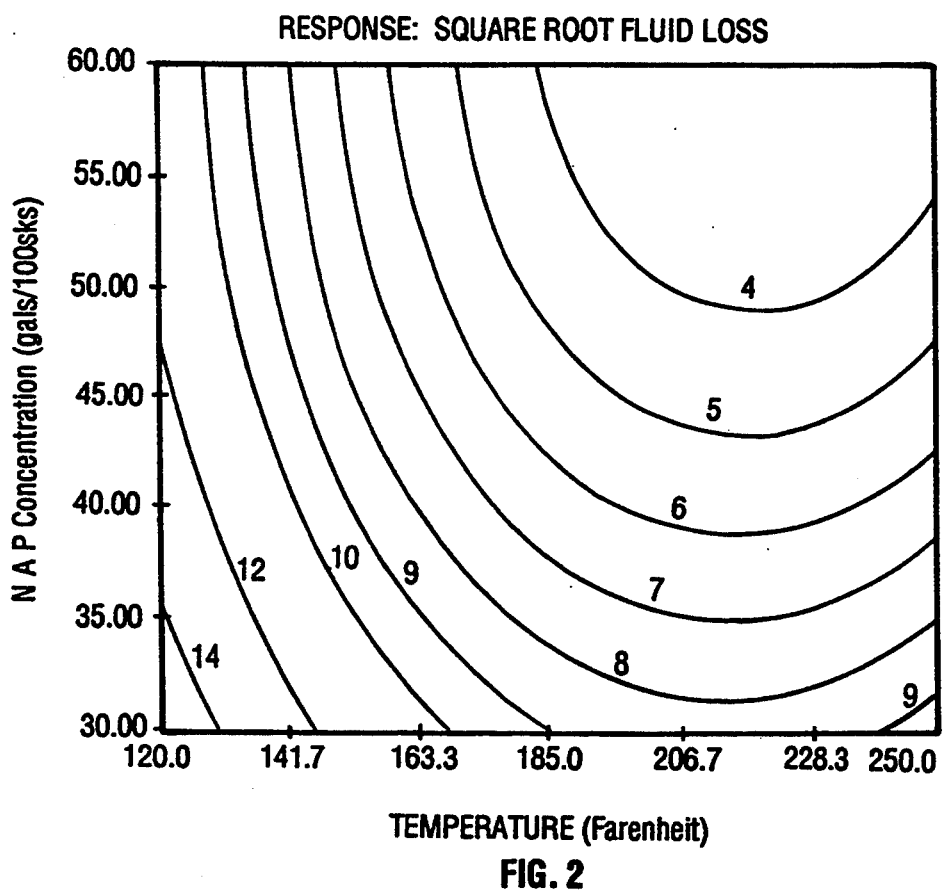
FIG. 2 is a similar response surface plot of a nonaqueous prepared polysulfonated polymer without pendant phosphonate groups.

Finally, response surface plots I and II compare ABP polymerized with 1% VPA as described above to the polymer prepared by the non-aqueous process (NAP) and without VPA as described in U.S. Pat. No. 4,309,523. One cement slurry is used for the comparison. This slurry is composed of Class H cement, with varying amounts of additive, 0.3% free water control additive and 0.5% retarder. The slurry is mixed at 16.2 lbs/gal. and is tested at various temperatures. Response surface plots of polymer concentration versus temperature in FIGS. 1 and 2 show that fluid loss control is much better at lower temperatures (<140° F.) when using the phosphonated ABP. The plots also show that at temperatures to 250° F., the phosphonated ABP meets or exceeds the performance of the unphosphonated NAP. The aqueous prepared polysulfonate polymer lacks the ability to effectively control fluid loss.

EXAMPLE 5

Vinyl phosphonate was grafted onto hydroxyethyl cellulose (HEC) using the following procedure to improve cement fluid loss control. A polymer solution containing 20 g of HEC (250 GXR, AQUALON, Wilmington, Del.) in 400 g of DI water was prepared and degassed with argon. Then, 6.82 g of vinyl phosphonic acid was added to the polymer solution, followed by 11.0 ml of 25% (wt) sodium hydroxide yielding a solution pH of 7.3. The reaction was initiated with 1 ml of 12% aqueous ammonium persulfate (297 ppm) and 1 ml of 5% (wt) aqueous sodium sulfite. The solution was stirred for 12 hours, after which the polymer was isolated by precipitating in acetone to yield 24.6 g of phosphonated HEC.

A cement slurry containing 827 g Class H cement, 4.96 g of a naphthalene sulfonate dispersant and 3.31 g of phosphonated HEC prepared above and 330.2 g of tap water were mixed and conditioned according to the procedure described in the *API Spec* 10. The apparent viscosities at various Fann 35 rates and fluid loss data 140° F. are shown in Table 4. Also shown in Table 4, for comparison, is data obtained from the non-phosphonated HEC used in the phosphonation method described above.

The phosphonated polymer provided both improved viscosities and 25% better fluid loss control.

TABLE 4

| Fann 35 RPM | Visc(cp) of PO$_3$-HEC | Visc(cp) of HEC |
|---|---|---|
| 600 | 76 | 132 |
| 300 | 78 | 153 |
| 200 | 80 | 162 |
| 100 | 87 | 177 |
| 6 | 150 | 250 |
| 3 | 200 | 300 |
| API Fluid Loss(cc) | 36 | 48 |

EXAMPLE 6

The experiment described in Example 2 was repeated except that 20 g polyvinyl alcohol (PVA) was substituted for the 20 g of HEC. Again, a cement slurry containing 861 g of Class H cement, 8.61 g of phosphonated PVA and 325.6 g of water were mixed and conditioned according to the API Spec 10. The apparent viscosities measured with a Fann 35 and the fluid loss control data are shown in Table V. These data are also compared to those obtained from the untreated PVA.

TABLE 5

| Fann 35 RPM | Visc(cp) of PO$_3$-PVA | Visc(cp) of PVA |
|---|---|---|
| 600 | 122 | * |
| 300 | 159 | * |
| 200 | 191 | 347 |
| 100 | 249 | 411 |
| 6 | 1550 | 1700 |
| 3 | 2500 | 2900 |
| API Fluid Loss(cc) | 211 | 518 |

An invention has been provided with several advantages. The addition of pendant phosphonate groups to water hydratable polymers substantially improves cement slurry properties, even beyond those due to a non-aqueous prepared polysulfonated polymer. These advantages include improved cost efficiency for water based polymerizations; settling is better controlled; fluid loss is improved, especially at low temperatures; fluid loss control is nearly temperature independent from 120° to 250° F.; slurry viscosity is adequate; slurry set times are comparable and salt tolerance is improved.

The improved results may be due to an increased ability for the cementing filter cake to repel fluids. The pendant phosphonate groups have an increased tendency to adsorb more tightly to the dehydrated cementing solids and bridge the particles of the filter cake. The bridging would make the filter cake more water repellant.

While the invention has been shown in only one of its forms, it is not thus limited but is susceptible to various changes and modifications without departing from the spirit thereof.

What is claimed is:

1. A cementing composition for oil and gas wells comprising:
   hydraulic cement;
   an effective amount of an additive to decrease fluid loss from the cementing composition when used during cementing operations, the additive comprising a phosphonated polymer having phosphonate groups pendant to a polymeric backbone, the phosphonate groups being added to a water hydratable, polyhydroxy polymer by reacting phosphonic acid or phosphonate with the water hydratable polymer; and
   water.

2. The cementing composition of claim 1, wherein the phosphonic acid has the formula:

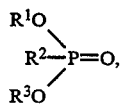

wherein
R¹ is a hydrogen,
R² is a 2 to about a 4 carbon alkenyl, and
R³ is a hydrogen, phosphonic acid, or a phosphonic acid polymer,
or a salt thereof.

3. The cementing composition of claim 2, wherein the phosphonic acid is vinyl phosphonic acid, methvinyl phosphonic acid, polyvinyl phosphonic acid or a salt thereof.

4. The cementing composition of claim 2, wherein the phosphonic acid is vinyl phosphonic acid or a salt thereof.

5. The cementing composition of claim 1, wherein the phosphonate groups are added to the water hydratable polymer by reacting about 0.2% to about 10% phosphonic acid based on the polymer weight with the water hydratable polymer.

6. The cementing composition of claim 5, wherein the phosphonate groups are added to a water hydratable polymer by reacting about 1% to about 3% phosphonic acid based on the polymer weight with the water hydratable polymer.

7. The cementing composition of claim 1, wherein the water hydratable, polyhydroxy polymer is selected from the group consisting of:
polysaccharides and polyvinyl alcohol.

8. The cementing composition of claim 7, wherein the water hydratable, polyhydroxy polymer is selected from the group consisting of:
cellulose, hydroxyethyl cellulose, carboxymethyl cellulose, carboxymethyl hydroxyethyl cellulose, guar gum, hydroxypropyl guar, carboxymethyl hydroxypropyl guar, starch, xanthan gum, karaya gum, locust bean gum, arabic gum, pectin and polyvinyl alcohol.

9. The cementing composition of claim 7, wherein the water hydratable, polyhydroxy polymer is selected from the group consisting of:
cellulose, hydroxyethyl cellulose, carboxymethyl cellulose, carboxymethyl hydroxyethyl cellulose and polyvinyl alcohol.

10. The cementing composition of claim 1, wherein the additive in the cementing composition is present in an effective amount to improve settling characteristics of the resulting slurry while maintaining desirable viscosity and setting time characteristics.

11. The cementing composition of claim 10, wherein the additive concentration is present in the range from about 0.1% to about 5% by weight of the dry hydraulic cement.

12. The cementing composition of claim 11, wherein the additive concentration is present in the range from about 0.5% to about 3% by weight of the dry hydraulic cement.

13. A cementing composition for oil and gas wells comprising:
hydraulic cement;
an effective amount of an additive to decrease fluid loss from the cementing composition when used during cementing operations, the additive comprising a phosphonated polymer having phosphonate groups pendant to a polymeric backbone, wherein the phosphonate groups are introduced during the polymerization of a water hydratable polymer with phosphonic acid having the structure of:

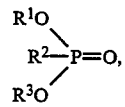

wherein
R¹ is a hydrogen,
R² is a 2 to about a 4 carbon alkenyl, and
R³ is a hydrogen, phosphonic acid, or a phosphonic acid polymer,
or a salt thereof; and
water.

14. The cementing composition of claim 13, wherein the phosphonic acid is vinyl phosphonic acid, methvinyl phosphonic acid, polyvinyl phosphonic acid or a salt thereof.

15. The cementing composition of claim 13, wherein the phosphonic acid is vinyl phosphonic acid or a salt thereof.

16. The cementing composition of claim 15, wherein the phosphonate groups are introduced during the polymerization of a water hydratable polymer by the addition of about 0.2% to about 10% phosphonic acid based on the polymer weight.

17. The cementing composition of claim 16, wherein the phosphonate groups are introduced during the polymerization of a water hydratable polymer by the addition of about 1% to about 3% phosphonic acid based on the polymer weight.

18. The cementing composition of claim 13, wherein the water hydratable polymer is a polysulfonated polymer.

19. The cementing composition of claim 18, wherein the polysulfonated polymer is selected from the group consisting of:
copolymers of N,N-dimethylacrylamide and 2-acrylamido, 2-methylpropane sulfonic acid; sulfonated polystyrenes; sulfonated polyvinyltoluenes; and copolymers of:
(a) vinyl sulfonate, styrene sulfonate or sodium acrylamidomethylpropanesulfonate;
(b) vinyl pyrrolidone, dimethyl acrylamide or vinylmethylacrylamide; and
(c) acrylamide.

20. The cementing composition of claim 19, wherein the polysulfonated polymer is a copolymer of:
(a) 5 to 95% by weight vinyl sulfonate, styrene sulfonate or units of the formula:

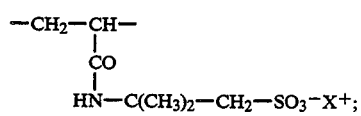

(b) 5 to 95% by weight vinyl pyrrolidone, dimethyl acrylamide or units of the formula

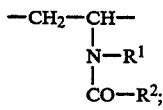

(c) 0 to 80% by weight dimethyl acrylamide or units of the formula

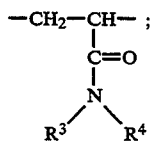

wherein $R^1$, $R^2$, $R^3$ and $R^4$ are hydrogen, methyl or ethyl and $X^+$ is a cation.

21. The cementing composition of claim 13, wherein the additive in the cementing composition is present in an effective amount to improve settling characteristics of the resulting slurry while maintaining desirable viscosity and setting time characteristics.

22. The cementing composition of claim 21, wherein the additive concentration is present in the range from about 0.1% to about 5% by weight of the dry hydraulic cement.

23. The cementing composition of claim 22, wherein the additive concentration is present in the range from about 0.5% to about 3% by weight of the dry hydraulic cement.

24. A cementing composition additive useful for oil and gas wells comprising a phosphonated polymer having phosphonate groups pendant to a polymerica backbone, the phosphonate groups being added to a water hydratable, polyhydroxy polymer by reacting phosphonic acid or phosphonate with the water hydratable polymer.

25. The additive of claim 24, wherein the phosphonic acid has the formula:

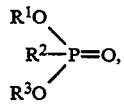

wherein
$R^1$ is a hydrogen,
$R^2$ is a 2 to about a 4 carbon alkenyl, and
$R^3$ is a hydrogen, phosphonic acid, or a phosphonic acid polymer,
or a salt thereof.

26. The additive of claim 25, wherein the phosphonic acid is vinyl phosphonic acid, methvinyl phosphonic acid, polyvinyl phosphonic acid or a salt thereof.

27. The additive of claim 25, wherein the phosphonic acid is vinyl phosphonic acid or a salt thereof.

28. The additive of claim 24, wherein the phosphonate groups are added to the water hydratable polymer by reacting about 0.2% to about 10% phosphonic acid based on the polymer weight with the water hydratable polymer.

29. The additive of claim 24, wherein the phosphonate groups are added to a water hydratable polymer by reacting about 1% to about 3% phosphonic acid based on the polymer weight with the water hydratable polymer.

30. The additive of claim 24, wherein the water hydratable, polyhydroxy polymer is selected from the group consisting of:
polysaccharides and polyvinyl alcohol.

31. The additive of claim 30, wherein the water hydratable, polyhydroxy polymer is selected from the group consisting of:
cellulose, hydroxyethyl cellulose, carboxymethyl cellulose, carboxymethyl hydroxyethyl cellulose, guar gum, hydroxypropyl guar, carboxymethyl hydroxypropyl guar, starch, xanthan gum, karaya gum, locust bean gum, arabic gum, pectin, and polyvinyl alcohol.

32. The additive of claim 31, wherein the water hydratable, polyhydroxy polymer is selected from the group consisting of:
cellulose, hydroxyethyl cellulose, carboxymethyl cellulose, carboxymethyl hydroxyethyl cellulose, and polyvinyl alcohol.

33. A cementing composition additive useful for oil and gas wells comprising a phosphonated polymer having phosphonate groups pendant to a polymeric backbone, wherein the phosphonate groups are introduced during the polymerization of a water hydratable polymer with phosphonic acid, the phosphonic acid having the formula:

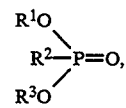

wherein
$R^1$ is a hydrogen,
$R^2$ is a 2 to about a 4 carbon alkenyl, and
$R^3$ is a hydrogen, phosphonic acid, or a phosphonic acid polymer,
or a salt thereof.

34. The additive of claim 33, wherein the phosphonic acid is vinyl phosphonic acid, methvinyl phosphonic acid, polyvinyl phosphonic acid or a salt thereof.

35. The additive of claim 33, wherein the phosphonic acid is vinyl phosphonic acid or a salt thereof.

36. The additive of claim 33, wherein the phosphonate groups are introduced during the polymerization of the water hydratable polymer by the addition of about 0.2% to about 10% phosphonate based on the polymer weight.

37. The additive of claim 33, wherein the phosphonate groups are introduced during the polymerization of a water hydratable polymer by the addition of about 1% to about 3% phosphonic acid based on the polymer weight.

38. The additive of claim 33, wherein the water hydratable polymer is a polysulfonated polymer.

39. The additive of claim 38, wherein the polysulfonated polymer is selected from the group consisting of:
copolymers of N, N-dimethylacrylamide and 2-acrylamido-2-methylpropane sulfonic acid; sulfonated polystyrenes; sulfonated polyvinyltoluenes; or copolymers of:
(a) vinyl sulfonate, styrene sulfonate or sodium acrylamidomethylpropanesulfonate;
(b) vinyl pyrrolidone, dimethyl acrylamide or vinylmethylacrylamide; and
(c) acrylamide.

40. The additive of claim 39, wherein the polysulfonated polymer is a copolymer of:

(a) 5 to 95% by weight vinyl sulfonate, styrene sulfonate or units of the formula:

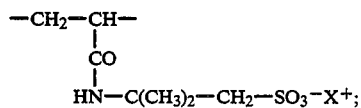

(b) 5 to 95% by weight vinyl pyrrolidone or units of the formula

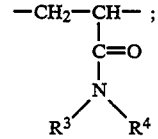

(c) 0 to 80% by weight diemthyl acrylamide or units of the formula $$-CH_2-CH- \atop \underset{R^3 \ \ R^4}{\underset{|}{\underset{N}{\underset{|}{C=O}}}}$$

wherein $R^1$, $R^2$, $R^3$ and $R^4$ are hydrogen, methyl or ethyl and $X^+$ is a cation.

* * * * *